United States Patent
Mayer (10) Patent No.: US 7,084,390 B2
(45) Date of Patent: Aug. 1, 2006

(54) POSITION-MEASURING DEVICE INCLUDING MEASURING GRADUATION AND SCANNING UNIT

(75) Inventor: Elmar Mayer, Nussdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 32 days.

(21) Appl. No.: 10/921,452

(22) Filed: Aug. 18, 2004

(65) Prior Publication Data

US 2005/0051716 A1 Mar. 10, 2005

(30) Foreign Application Priority Data

Aug. 18, 2003 (DE) ................................. 103 38 991

(51) Int. Cl.
*G01D 5/34* (2006.01)
(52) U.S. Cl. .......................... 250/231.16; 250/231.18; 356/616
(58) Field of Classification Search ..............................
250/231.13–231.18, 237 R, 237 G; 356/616, 356/617; 33/1 PT, 1 N; 341/11, 13, 113
See application file for complete search history.

(56) References Cited

U.S. PATENT DOCUMENTS

| | | | | |
|---|---|---|---|---|
| 5,604,345 A * | 2/1997 | Matsuura | ................. | 250/237 G |
| 5,619,132 A | 4/1997 | Spies | | |
| 5,814,812 A * | 9/1998 | Holzapfel | ............... | 250/231.16 |
| 5,874,729 A * | 2/1999 | Holzapfel | ............... | 250/231.16 |
| 5,889,280 A * | 3/1999 | Matsuura | ................. | 250/237 G |
| 5,981,942 A * | 11/1999 | Ieki | ........................ | 250/231.16 |
| 5,994,692 A * | 11/1999 | Holzapfel | ............... | 250/237 G |
| 6,094,307 A * | 7/2000 | Ieki | ............................. | 359/569 |
| 6,259,249 B1 | 7/2001 | Miyata | | |
| 6,392,224 B1 * | 5/2002 | Holzapfel et al. | ...... | 250/231.13 |
| 6,492,806 B1 | 12/2002 | Shirai | | |
| 6,528,783 B1 * | 3/2003 | Mortara et al. | ......... | 250/231.13 |
| 2001/0017349 A1 * | 8/2001 | Holzapfel et al. | ...... | 250/231.13 |
| 2002/0005716 A1 | 1/2002 | Shirai | | |
| 2002/0008195 A1 * | 1/2002 | Aoki et al. | ............. | 250/231.14 |
| 2003/0047673 A1 * | 3/2003 | Thorburn et al. | ....... | 250/231.13 |
| 2003/0048536 A1 * | 3/2003 | Aoki | ........................... | 359/566 |
| 2003/0085345 A1 | 5/2003 | Franklin et al. | | |
| 2004/0046113 A1 | 3/2004 | Mayer et al. | | |

FOREIGN PATENT DOCUMENTS

| | | |
|---|---|---|
| DE | 44 11 808 | 10/1994 |
| DE | 195 05 176 | 8/1995 |
| DE | 195 08 700 | 8/1996 |
| DE | 198 55 685 | 6/1999 |
| DE | 100 20 575 | 10/2001 |
| DE | 101 28 619 | 12/2001 |
| EP | 1 308 700 | 5/2003 |

* cited by examiner

*Primary Examiner*—Stephone B. Allen
*Assistant Examiner*—Davienne Monbleau
(74) *Attorney, Agent, or Firm*—Kenyon & Kenyon LLP

(57) ABSTRACT

A position-measuring device includes a measuring graduation extending along a measuring direction, a scanning unit for scanning the measuring graduation, and a detection device of the scanning unit including a plurality of detector elements that are arranged periodically one after the other along an extension direction and that, during scanning of the measuring graduation, generate output signals able to be supplied to an evaluation unit. In each case, a plurality of adjacent detector elements are interconnected to form a detector group such that their output signals are able to be joined and supplied as a unified signal to the evaluation unit. The detector elements are combined to form detector groups, and are arranged in the form of detector groups one after the other along the extension direction such that at least one defined harmonic is eliminated from the output signals.

25 Claims, 6 Drawing Sheets

FIG 5B

POSITION-MEASURING DEVICE INCLUDING MEASURING GRADUATION AND SCANNING UNIT

CROSS-REFERENCE TO RELATED APPLICATIONS

The present application claims priority to Application No. 103 38 991.1, filed in the Federal Republic of Germany on Aug. 18, 2003, which is expressly incorporated herein in its entirety by reference thereto.

FIELD OF THE INVENTION

The present invention relates to a position-measuring device and to a scanning unit.

BACKGROUND INFORMATION

A position-measuring device of this type includes a linear or curved measuring graduation extending along a measuring direction, a scanning unit for scanning the measuring graduation, as well as a detection device of the scanning unit that includes a plurality of detector elements which are positioned periodically one after the other along an extension direction and which, during the scanning of the measuring graduation, generate output signals able to be supplied to an evaluation unit. In this context, a plurality of adjacent detector elements of the detection device are interconnected to form in each case a detector group such that their output signals are joined and are able to be supplied as a unified signal to the evaluation unit.

The interconnection of adjacent detector elements to form in each case a detector group is intended to make it possible for a scanning unit having a detection device which is provided for scanning a periodic measuring graduation having a first, fine grating structure, to at the same time also be used for scanning a measuring graduation having a different, coarser grating structure. Reference is made to European Published Patent Application No. 1 308 700.

For example, if the measuring graduation having the coarser grating structure has the n-fold grating constant of the measuring graduation having the first, finer grating structure, then, for instance, in each case n-adjacent detector elements of the detection device are interconnected to form one detector group in order to scan the measuring graduation having the coarser grating constant using the same detection device.

In such position-measuring devices, the measuring graduation is typically formed as a mark graduation in the form of a plurality of marks arranged, e.g., periodically, one after the other along the measuring direction. The measuring direction may be formed both by a straight line (linear position-measuring system) and by a curved, e.g., circularly extended line (in the case of a so-called rotary encoder or angular position measuring system). The detector elements are formed, for example, as photo elements which optically scan the measuring graduation and, in so doing, generate electrical output signals able to be supplied to an evaluation unit.

The individual detector elements of the detection device of the scanning unit may be shaped in a conventional manner with respect to their geometric form such that when scanning the measuring graduation having the first, finer grating constant, a harmonics filtering operation is carried out. That is to say, by the selection of suitable contours for the detector elements, certain specifiable harmonics may be eliminated when scanning the measuring graduation having the smaller grating constant. However, if for scanning the coarser measuring graduation having the larger grating constant, in each case a plurality of adjacent detector elements are combined to form one detector group, then the output signal generated when scanning the coarser measuring graduation has a significant harmonics component that may interfere in the further processing and evaluation of the output signal. Reference is made to German Published Patent Application No. 195 05 176.

SUMMARY

An example embodiment of the present invention may provide a position-measuring device that may exhibit improved quality of the output signal of the detection device.

The detector elements of the detection device may be combined to form detector groups, and they may be arranged one after the other along the extension direction so that at least one defined harmonic is eliminated from the output signals of the detection device.

The design approach is based on the knowledge that harmonics may be eliminated from the output signals not only by a specific shaping of the detector elements, but also (utilizing certain filter functions) by a specific construction of the individual detector groups as well as by their arrangement. The individual detector elements are therefore combined to create suitable detector groups as a function of a selected filter function, with which specific, predefined harmonics are to be eliminated from the output signals.

Here, the grating constant of the, e.g., coarser, measuring graduation to be scanned may be an integral multiple of the smallest grating constant of the detection device, thus of the period of the arrangement of the individual detector elements without consideration of phases and interconnections of the detector elements.

In this context, the detector groups, set apart from each other in the extension direction of the detection device, that generate output signals of one phase (e.g., 0°, 90°, 180° or 270°, respectively) are interconnected, so that their output signals are supplied as a unified signal to the evaluation unit. That is to say, each detector group is assigned one output signal having a defined phase, and the detector groups whose output signal has the same phase are interconnected so that their output signals are supplied as a joint output signal to the evaluation unit.

To eliminate specific, predefined harmonics using a filter function suitable for this purpose, it may be necessary for the number of detector elements making up the individual detector groups having output signals of one phase to vary, at least for a portion of the phases. Moreover, at least for a portion of the phases, the distance between adjacent detector elements of the same phase may vary. The detector groups may be arranged along the extension direction, e.g., in the manner that base units, each made up of a plurality of detector groups, are positioned one after the other (e.g., not periodically) along the extension direction. A base unit of the detection device should be understood to mean a unit having the minimal number of detector elements permitting the desired harmonics filtering.

According to an example embodiment of the present invention, all detector groups of the detection device are positioned one after the other along one track.

According to an example embodiment of the present invention, the detector groups are arranged along at least two tracks situated side by side, perpendicular to the extension direction of the detection device.

In this context, according to an example embodiment, the detector groups of one phase arranged in different tracks are displaced relative to each other by a specific displacement distance Δx. For a defined harmonics filtering, displacement distance Δx in the extension direction of the detection device for adjacent detector groups along the extension direction, which are arranged in different tracks, is:

$$\Delta x = m^* d^* (1 \pm 1/(2^*n));$$

where, e.g., $d = i^* g_f$. In the foregoing, d represents the grating constant of the measuring graduation to be scanned, $g_f$ represents the smallest grating constant of the detection device (thus indicates its finest periodic raster formed by the individual detector elements), n represents the order of the harmonic to be filtered, m represents a whole number, and i represents a natural number.

According to an example embodiment, all detector groups of one phase are arranged in one track, so that adjacent tracks each exclusively have detector groups of different phases. In this case, within one base unit necessary for filtering the specific harmonic, it is possible to arrange the detector groups of a first and a second phase (e.g., 0° and 180°) one after the other along one track, and the detector groups of a third and a fourth phase (e.g., 90° and 270°) one after the other along another track in the extension direction of the detection device.

However, the detector groups of one phase may also be positioned partially in the one and partially in the other track.

The distribution of the detector groups, from which signals of one phase are generated, not only along the measuring or extension direction of the detection device, but also on at least two adjacent tracks, may reduce the sensitivity of the arrangement to soiling. Moreover, in this case the resulting scanning signal may not be influenced by possible changes in the mark width of the scanned measuring graduation.

The arrangement of the detector groups along the extension direction of the detection device is in each case determined by at least one generating filter function that indicates for each detector element, the adjacent detector elements with which it is to be interconnected to form a detector group. In an example embodiment, the arrangement of the detector groups along the extension direction is determined by the linkage of at least two generating filter functions that relate to different detector groups and/or to different features of a detector group. This may make it possible to achieve a particularly high filling factor in the detector arrangement resulting from the formation of detector groups, that is to say, the greatest possible number of the detector elements provided for scanning a finer scale with a small grating constant are utilized for forming the detector groups.

The arrangement of the detector groups along the extension direction may be determined by the linkage of at least two complementary filter functions that relate to different detector groups and/or to different features of a detector group. To be understood by complementary filter functions are those filter functions which complement each other with respect to the total filtering action in relation to specific stipulations, such as the minimization of the harmonic content of the output signal. Examples of suitable complementary filter functions are indicated below in the description of example embodiments.

To eliminate harmonics from the output signals, on one hand, it is possible to vary the distance between interconnected, in-phase detector groups along the extension direction, the average distance between the midpoints (observed along the extension direction of the detection device) of the in-phase detector groups, e.g., corresponding to a constant value.

According to one filter function, distance Δx between the detector groups is determined by the rule:

$$\Delta x = m^* d^* (1 \pm 1/(2^*n));$$

where, e.g., $d = i^* g_f$. In the foregoing, d represents the grating constant of the measuring graduation to be scanned, $g_f$ represents the smallest grating constant of the periodic arrangement of detector elements, n represents the harmonic to be filtered, m represents a whole number and i represents a natural number.

Another filter function is characterized by the fact that the extension of interconnected, in-phase detector groups along the extension direction of the detection device varies, in that the individual, in-phase detector groups are in each case formed by a different number of detector elements. In this context, the average extension of the in-phase detector groups may correspond to the period of the fundamental wave of the output signals of the corresponding detector group.

According to an example of a filter function, extension Δb of the detector groups in the extension direction of the detection device is formed according to the rule:

$$\Delta b = k^* d/n;$$

where, e.g., $d = i^* g_f$. In the foregoing, i, k represent natural numbers, d represents the grating constant of the measuring graduation to be scanned, $g_f$ represents the smallest grating constant of the periodic arrangement of the detector elements, and n represents the order of the harmonic to be filtered.

To maximize the filling factor and minimize the error in suppressing harmonics, the arrangement of the detector groups along the extension direction of the detection device may be determined by the linkage of a first generating filter function, according to which the spacing of the detector groups of the same phase varies in the extension direction, with a second generating filter function with which the extension of the detector groups along the extension direction is defined.

According to an exemplary embodiment of the present invention, the arrangement of the detector groups along the extension direction of the detection device is determined by an arcsine function, position x of the detector groups along the extension direction being specifically described by the function:

$$x = k^* d/(2^* \Pi)^* \arcsin(k/N);$$

where, e.g., $d = i^* g_f$. Here, i and N represent natural numbers and k represents a whole number having an amount less than or equal to 1. $g_f$ represents the smallest grating constant of the periodic arrangement of detector elements, and d represents the grating constant of the measuring graduation to be scanned. The greater the value is selected to be for N, the more comprehensive the filter function of such an arcsine filter may be. All harmonics may be covered using such a filter.

According to an aspect of this exemplary embodiment of the present invention, the arrangement of the detector groups in the extension direction of the detection device may be determined by the linkage of two arcsine functions, the second arcsine function being of the type:

$$x = (k+0.5)^* d/(2^* \Pi)^* \arcsin(k/N)$$

In this case, the first or the second arcsine function indicates the arrangement of those detector groups whose output signals have the phase 0° or 180°. Corresponding formulas apply for the location of the detector groups which generate output signals of the phase 90° or 270°. In each case, the expression k+0.25 or k+0.75 is to be used at the beginning of the corresponding term.

Provision may also be made for the one arcsine function to indicate the arrangement of the detector groups along a first track, and for the second arcsine function to indicate the arrangement of the detector groups along a second, adjacent track.

In general, it may be provided that the extension of the detector groups along the extension direction and/or perpendicular to the extension direction of the detection device is varied according to a trigonometric or cyclometric (inverse trigonometric) function, e.g., according to a sine, cosine, arcsine, arccosine function, etc. All harmonics (especially also for higher harmonics) may thereby be covered and filtered.

In an example embodiment of the present invention, detector elements arranged side by side perpendicular to the extension direction of the detection device are in each case interconnected to form detector groups such that specifiable harmonics may thereby be eliminated from the output signals. The extension of the detector groups perpendicular to the aforesaid extension direction may be varied, for example, according to a cosine function.

According to an example embodiment of the present invention, a position-measuring device includes: a measuring graduation extending along a measuring direction; and a scanning unit configured to scan the measuring graduation, the scanning unit including a detection device, the detection device including a plurality of detector elements arranged periodically one after another along an extension direction, the detector elements configured to generate, during scanning of the measuring graduation, output signals suppliable to an evaluation unit, a plurality of adjacent detector elements interconnected to form a detector group and arranged to join output signals and to supply output signals as a unified signal to the evaluation unit, the detector groups arranged one after another along the extension direction to eliminate at least one defined harmonic from the output signals.

A plurality of detector groups, set apart from each other in the extension direction, may be interconnected to join output signals and to supply output signals as a unified signal to the evaluation unit.

The interconnected detector groups may be configured to generate output signals of one phase.

A number of detector elements of the detector groups of one phase may vary along the extension direction.

Individual detector elements interconnected to form a detector group may be configured to filter at least one further harmonic that results from scanning of a measuring graduation having a different graduation period.

The detector groups may be arranged along at least two tracks located side by side perpendicular to the extension direction.

An arrangement of the detector groups along the extension direction may be in accordance with at least one generating filter function that, for each detector element, indicates with which adjacent detector elements the detector element is interconnected.

The arrangement of the detector groups along the extension direction may be in accordance with a linkage of at least two generating filter functions that relate at least one of (a) to different detector groups and (b) to different features of a detector group.

The arrangement of the detector groups along the extension direction may be in accordance with a linkage of at least two complementary filter functions that relate at least one of (a) to different detector groups and (b) to different features of a detector group.

The detector groups of individual phases may be arranged in different tracks along the extension direction displaced relative to each other by a specific displacement distance.

The displacement distance $\Delta x$ of the detector groups of one phase may satisfy the conditions:

$$\Delta x = m^* d^* (1 \pm 1/(2^*n)); \text{ and}$$

$$d = i^* g_f;$$

in which d represents a grating constant of the measuring graduation to be scanned, $g_f$ represents a grating constant of a periodic arrangement of individual detector elements, n represents a harmonic to be filtered, m represents a whole number, and i represents a natural number.

A distance between detector groups may vary along the extension direction to eliminate harmonics.

The distance $\Delta x$ between detector groups may satisfy the conditions:

$$\Delta x = m^* d^* (1 \pm 1/(2^*n)); \text{ and}$$

$$d = i^* g_f;$$

in which d represents a grating constant of the measuring graduation to be scanned, $g_f$ represents a grating constant of a periodic arrangement of individual detector elements, n represents a harmonic to be filtered, m represents a whole number, and i represents a natural number.

An extension of the detector groups may vary along the extension direction to eliminate harmonics.

The extension $\Delta b$ of the detector groups in the extension direction may satisfy the conditions:

$$\Delta b = k^* d/n; \text{ and}$$

$$d = i^* g_f;$$

in which i and k represent natural numbers, d represents a grating constant of the measuring graduation to scanned, $g_f$ represents a grating constant of a periodic arrangement of individual detector elements, and n represents a harmonic to be filtered.

An arrangement of the detector groups along the extension direction may be in accordance with a linkage of a first generating filter function, according to which a spacing of the detector groups in the extension direction varies, with a second generating filter function, according to which an extension of the detector groups in the extension direction varies.

The detector groups may be arranged along the extension direction in accordance with an arcsine function.

A position x of the detector groups may satisfy the conditions:

$$x = k^* d/(2^* \Pi)^* \arcsin(k/N); \text{ and}$$

$$d = i^* g_f;$$

in which i and N represent natural numbers, k represents a whole number with an absolute value less than or equal to N, d represents a grating constant of the measuring graduation to be scanned, and $g_f$ represents a grating constant of a periodic arrangement of individual detector elements.

An arrangement of the detector groups in the extension direction may be in accordance with a linkage of two arcsine functions.

An extension of the detector groups perpendicular to the extension direction may vary.

The extension of the detector groups perpendicular to the extension direction may vary in accordance with one of (a) a cosine function and (b) a sine function.

According to an example embodiment of the present invention, a scanning unit for scanning a measuring graduation that extends along a measuring direction includes: a detection device including a plurality of detector elements arranged periodically one after another along an extension direction, the detector elements configured to generate, during scanning of the measuring graduation, output signals suppliable to an evaluation unit, a plurality of adjacent detector elements interconnected to form a detector group and arranged to join output signals and to supply output signals as a unified signal to the evaluation unit, the detector groups arranged one after another along the extension direction to eliminate at least one defined harmonic from the output signals.

An arrangement of the detector groups along the extension direction may be in accordance with at least one generating filter function that, for each detector element, indicates with which adjacent detector elements the detector element is interconnected.

A distance between detector groups may vary along the extension direction to eliminate harmonics.

An extension of the detector groups may vary along the extension direction to eliminate harmonics.

An extension of the detector groups perpendicular to the extension direction may vary.

Other features and aspects hereof are set forth in the following description of exemplary embodiments with reference to the appended Figures.

BRIEF DESCRIPTION OF THE DRAWINGS

FIG. 5b illustrates a detail representation of an arrangement similar to that illustrated in FIG. 5a.

DETAILED DESCRIPTION

Figure 7:
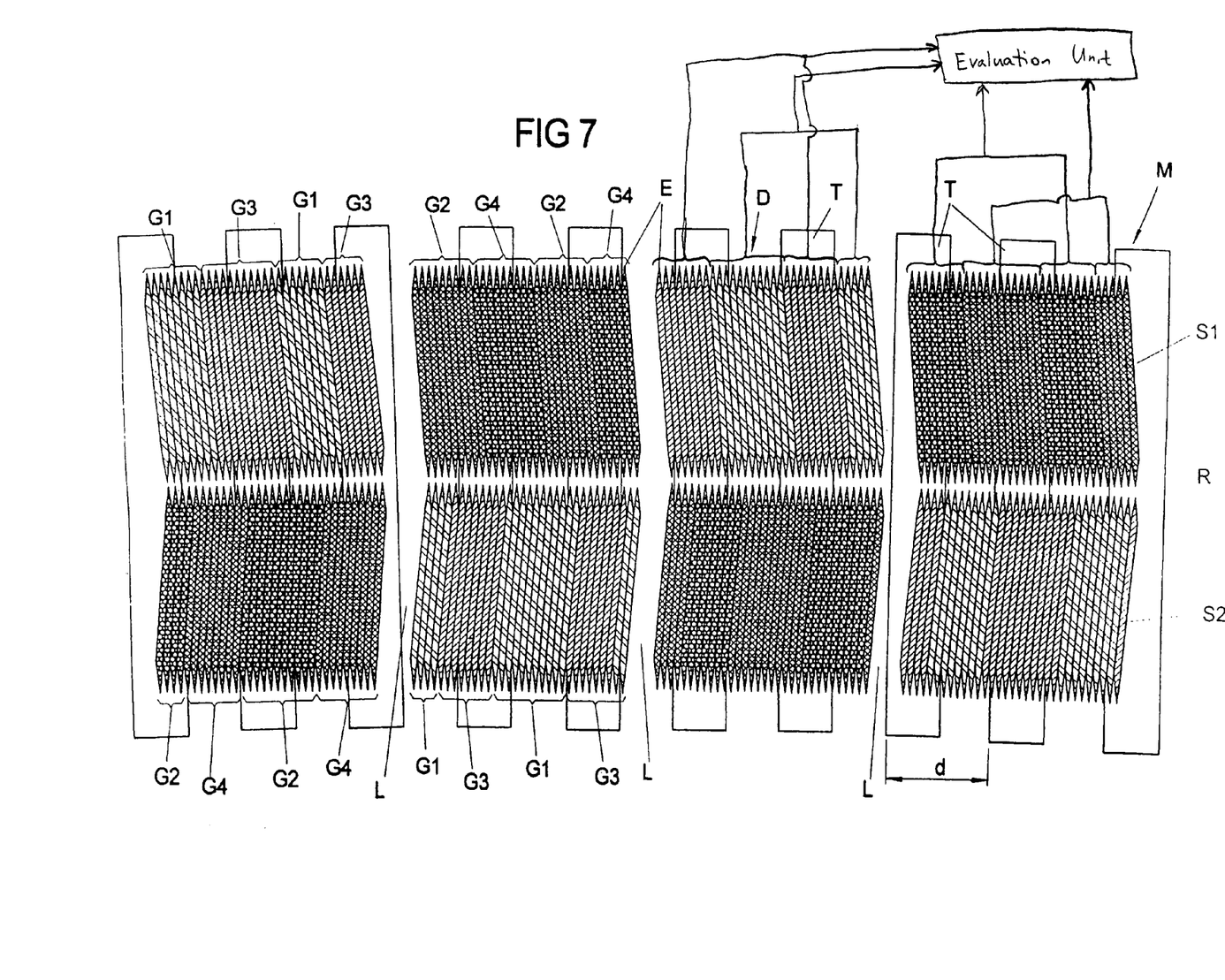
FIG. 7 is a schematic representation of a measuring graduation of a rotary encoder having a defined grating constant, which is scanned by a scanning unit having a detection device.

FIG. 7 schematically illustrates a section of a measuring graduation M of a rotary encoder (angular position-measuring system) which includes a plurality of graduation marks T having a grating constant d and arranged periodically one after the other along extension direction R (defined by a circular arc) of measuring graduation M.

To scan measuring graduation M having grating constant d, a detector device D of a scanning unit is used which includes a plurality of detector elements E in the form of photo elements that are arranged one after the other in two side-by-side tracks S1, S2 along extension direction R of measuring graduation M.

Individual detector elements E in the form of photo elements are selected with respect to their size, their arrangement one after the other and their geometry such that, when scanning a measuring graduation of a rotary encoder having a grating constant smaller by fourfold than measuring graduation M illustrated in FIG. 7, generate output signals which, because of the geometry of individual detector elements E, are free of specific, predefined harmonics. In this context, each individual detector element E generates an output signal having a specific phase, and detector elements E which are set apart from each other along extension direction R and generate output signals of the same phase supply their respective output signals as a unified signal to an evaluation unit where the output signals of different phases may be evaluated, thereby making it possible to determine the relative location of detection device D with respect to measuring graduation M along extension or measuring direction R. When measuring graduation M on one hand and detection device D on the other hand are allocated to two different machine parts of a machine tool and are in each case joined to them, it is thereby possible to determine a relative movement of the two machine parts with respect to each other.

For scanning measuring graduation M, illustrated in FIG. 7, whose grating constant d is greater than the grating constant of that measuring graduation for whose scanning, individual detector elements E as such are originally designed and arranged, detector elements E are combined to form detector groups G1, G2, G3, G4 which are distributed on both tracks S1, S2 and in each case appear there several times. In this context, there are four different types of detector groups G1, G2, G3, G4, each type G1 or G2 or G3 or G4 generating output signals of a specific phase (0° or 90° or 180° or 270°).

Detector elements E are interconnected to form detector groups G1, G2, G3, G4 in the manner that the output signals of the detector elements (electrical output signals in the case of detector elements in the form of photo elements which optically scan measuring graduation M) of a detector group G1, G2, G3 or G4 are each supplied jointly to the allocated evaluation unit. Detector elements E of one detector group G1, G2, G3 or G4 are thus in each case electrically interconnected. Moreover, those detector groups (set apart from each other along extension direction R) which generate an output signal of one and the same phase are interconnected, so that the output signals of one phase are fed jointly to the evaluation unit. Thus, all those detector groups G1 which generate output signals of a phase of 0° are electrically interconnected; all those detector groups G2 which generate output signals of a phase of 90° are electrically interconnected; all those detector groups G3 which generate output signals of a phase of 180° are electrically interconnected; and all those detector groups G4 which generate output signals of a phase of 270° are electrically interconnected.

The detector elements of one detector group are in each case illustrated in FIG. 7 in that they have the same shaded portion. The same holds true for those detector groups, set apart from each other along extension direction R, which generate output signals having a matching phase.

Gaps L between adjacent detector groups illustrated in FIG. 7 each include those detector elements which were not used when forming detector groups. Alternatively, it is possible to provide no sensors at gaps L from the start for technical reasons.

In the following, with reference to FIGS. 1 to 6, rules are indicated and analyzed according to which the individual detector elements are able to be interconnected to form detector groups to, on one hand, obtain, e.g., the greatest possible filling factor, that is, to use as many detector elements as possible when forming the detector groups, and on the other hand, to be able to filter defined harmonics out of the output signals using the detector device formed by the detector groups.

Figure 1:
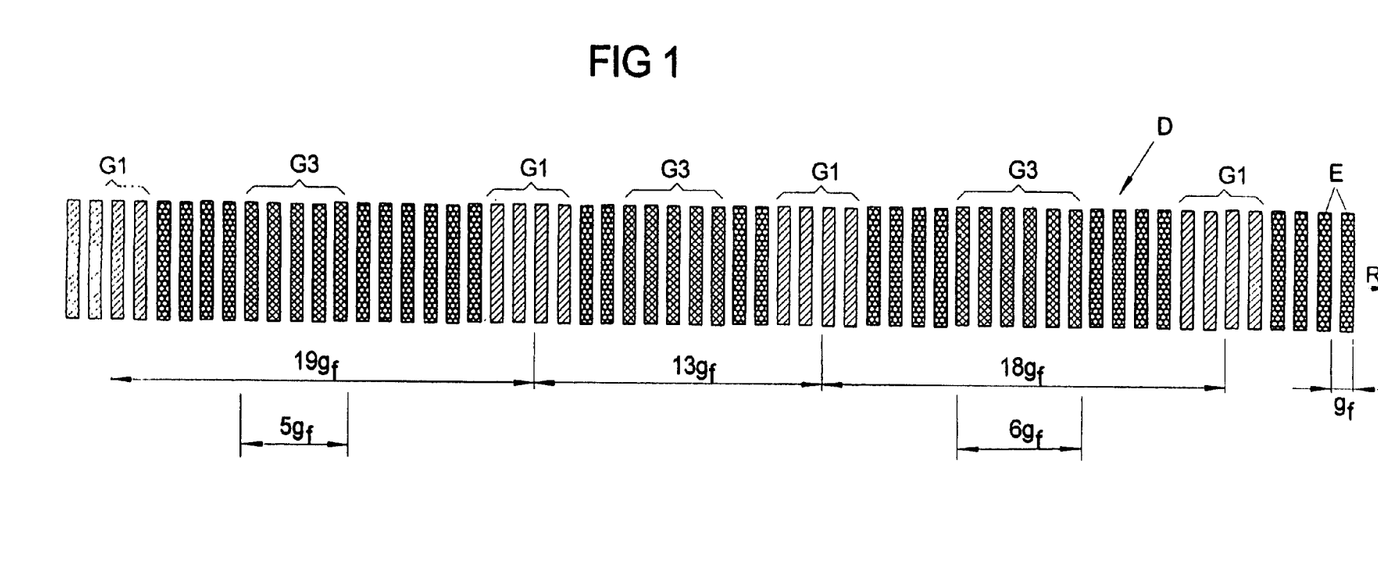
FIG. 1 illustrates a first exemplary embodiment of a linearly extended detection device for scanning a measuring graduation, the detection device including a plurality of detector elements in the form of photo elements arranged one after the other along the extension direction, and in each case being interconnected to form detector groups.
Figure 2:
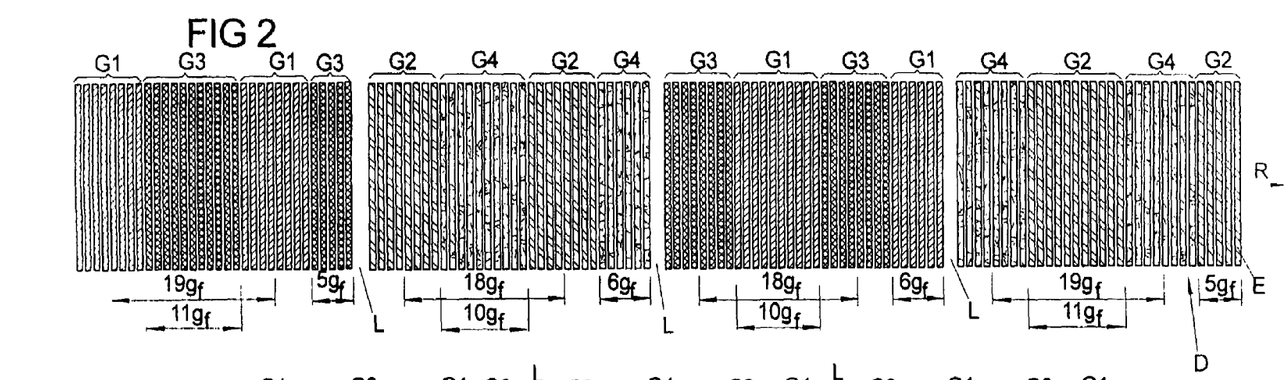
FIG. 2 illustrates a modification of the arrangement illustrated in FIG. 1.
Figure 3:
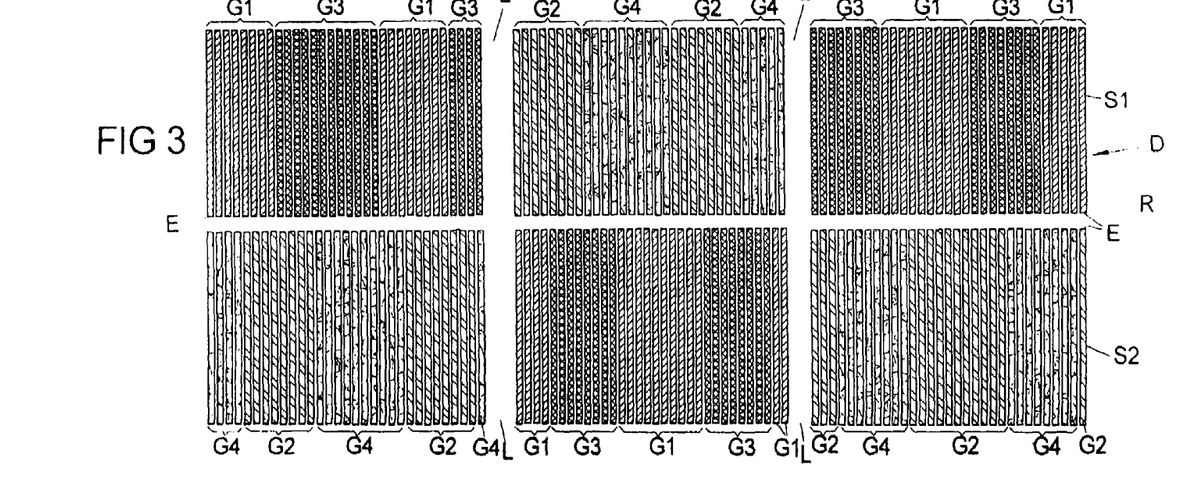
FIG. 3 illustrates a modification of the arrangement illustrated in FIGS. 1 and 2, the detector elements and therefore the detector groups being distributed on two adjacent tracks arranged side by side transversely to the extension direction.

The starting point for the exemplary embodiments illustrated in FIGS. 1 to 3 is in each case the following consideration:

Suitable for eliminating harmonics in the output signals of the detector groups is a distance filter in the form of a so-called two-mark filter using the generation rule:

$$\Delta x = m^* d^* (1 \pm 1/(2^*n));$$

where $\Delta x$ represents the distance between adjacent detector groups, d represents the grating constant of the measuring graduation to be scanned, and n represents the order of the harmonics to be filtered, e.g., n=3 or n=5. m represents a whole number. The minimal extension of such a filter extends over two periods of the output signal to be filtered.

Another possibility for eliminating harmonics is the use of a width filter in the form of a single-slit filter using the generation rule:

$$\Delta b = k^* d/n;$$

where $\Delta b$ represents the width of the respective detector group, d represents the grating constant of the measuring graduation to be scanned and n represents the harmonic to be filtered. k represents an element of natural numbers.

Assuming the finest raster $g_f$ (corresponding to the smallest grating constant of the individual detector elements) of detection device D extending along measuring or extension direction R, the following rules starting therefrom result for combining detector elements E to form detector groups, as well as for their distribution along extension direction R for scanning a measuring graduation having a grating constant that is greater than the grating constant to which finest raster $g_f$ is matched.

Assuming $d = i^* g_f$, that is, grating constant d of measuring graduation M to be scanned is an integral multiple of finest raster $g_f$ of detection device D, as is taken as a basis in the following, then:

$$\Delta x = d^*(1 + 1/(2^*n)) = i^* g_f^*(1 + 1/(2^*n))$$

In general, $\Delta x$ mod $g_f \neq 0$, that is to say, distance $\Delta x$ between two detector groups of the same phase, formed according to the generation rule above, is not an integral multiple of underlying finest raster $g_f$ of individual detector elements E. This means that distance $\Delta x$ between two detector groups of the same phase, calculated according to the generation rule for the distance filter, may not be represented by an integral multiple of the underlying finest raster $g_f$. If the integral multiple nearest to the actual value is selected, then deviations $f_1$, $f_2$ from optimal distance $\Delta x$ (error) calculated according to the generation rule result, which generally may be represented as follows:

$$f_1 = 1 - P/2n \text{ and/or}$$

$$f_2 = P/2n;$$

where $p \in IR$, depending upon whether the actual distance between the detector groups of the same phase corresponding to an integral multiple of raster $g_f$ is selected to be smaller or greater than the ideal value of $\Delta x$.

However, for improved (optimized) filtering, it is possible to utilize the fact that deviations $f_1$ and $f_2$ indicated above may be mutually compensating, i.e.:

$$\Sigma f = I_1^* f_1 - I_2^* f_2, \text{ with } I_1, I_2 \in NI$$

applies for the composite error.

From this, for minimizing the harmonics content, it follows that:

$$2n/k - 1 = I_2/I_1; \text{ with } I_1, I_2 \in NI,$$

the sum $I_1 + I_2$ at the same time also being a measure for the number of periods of grating constant d to be scanned. This is further clarified in the following by an example.

Let us say grating constant $d_f$ of the measuring graduation (finest grating constant) originally to be scanned using the detection device amounts to $d_f$ equals 1/2048. With four detection elements (photo detectors) per period, the result is $g_f = 1/4 * d_f$.

The larger grating constant of the coarser measuring graduation to be scanned using the same detection device would amount to d=1/512. That is to say, a measuring graduation having the fourfold grating constant d=1/512 is additionally to be scanned using a detection device of a predefined raster $g_f$ originally designed for scanning a measuring graduation having the grating constant $d_f = 1/2048$. According to the explanations above with respect to the generation rule for a distance filter, it follows for filtering the third harmonic (i.e., n=3) that:

$$\Delta x = d * \left(1 \pm \frac{1}{2} * 3\right)$$

$$= 4 * d_f * \left(1 \pm \frac{1}{2} * 3\right)$$

$$= 16 * g_f * \left(1 \pm \frac{1}{6}\right)$$

$$= 16 * \left(g_f \pm \frac{1}{6} * g_f\right)$$

From the formulas clarified above for the minimization of the composite error for minimizing the harmonic content, it further results for the minus branch of the equation that $I_2/I_1 = 6/4 - 1 = 1/2$ and $I_1 + I_2 = 3$, where $I_1 = 2$ and $I_2 = 1$. That is to say, to on average obtain the ideal sought-after value $\Delta x$ with respect to the distance between detector groups of the same phase, a distance between the detector groups of the same phase that is too short by $1/3 * g_f$ is in each case selected twice and a distance between the detector groups of the same phase that is too long by ⅔*$g_f$ is selected once for the actual distances, the minimal length of the filter thereby at the same time being set to six periods. Therefore, the distance too short by ⅓*$g_f$ occurs twice as often between immediately successive detector groups of the same phase as the distance too long by ⅔*$g_f$.

Expressed in units of the finest raster $g_f$ of the detection device, the following center-to-center distances therefore result for the detector groups of the same phase to be varied with respect to their distance. Starting from the above equation for the filtering of the third harmonic of a phase, ideal distances Δx of 18.66*$g_f$ and 13.33*$g_f$ are obtained, depending upon whether the "plus" or the "minus" branch of the equation is selected for Δx. Resulting for the real detector arrangement are therefore real distances of, on one hand, 19*$g_f$ and 18*$g_f$, the first-named, larger distance occurring twice as frequently as the second-named smaller, and on the other hand, real distances of 13*$g_f$ and 14*$g_f$, the first-named, smaller distance occurring twice as frequently as the second-named, larger distance.

The calculations, described above in detail, for distance filtering (two-mark filtering) may be transferred analogously to the treatment of the width filter (single-slit filter), where instead of varying the distance between successive detector groups of the same phase, the width of the detector groups of the same phase along extension direction R is varied.

Taking the above equation as the basis, the following is valid for width Δb of the detector groups of the same phase in the case of filtering the third harmonic:

$$\Delta b = k*d/3 = k*16*g_f*\frac{1}{3} = k*5.33 g_f$$

Starting from ideal width Δb of the detector groups having the value Δb=5.33*$g_f$, detector groups of a specific phase having the width Δb=5*$g_f$ occur twice as often in the real arrangement as corresponding detector groups having the width Δb=6*$g_f$.

FIG. 1 illustrates a combination of the two above-described filter methods (distance filter and width filter) for filtering the third harmonic (i.e., n=3), with which it is possible to implement a filtering for the cosine signal. That is to say, detector groups G1 whose output signals have the phase 0°, as well as detector groups G3 whose output signals have the phase 180° are interconnected according to the above rules. The first-named detector groups G1, given a constant width, are subject to the distance filter (specific to the distance between the midpoints—observed in extension direction R—of the immediately successive detector groups G1), and the second-named detector groups G3 have different widths of 5*$g_f$ and 6*$g_f$ for attaining average width Δb=5.33*$g_f$.

In the arrangement illustrated in FIG. 1, besides the above-described filtering of the cosine signal, only a limited filtering of the sine signal having the phases 90° and 270° is possible. To be able to subject the cosine signal and the sine signal to a filtering in the same manner, a further development of the arrangement illustrated in FIG. 1, illustrated in FIG. 2, is provided.

As illustrated in FIG. 2, detector blocks made up in each case of two grating periods (d), i.e., made up of 32 detector elements E, are used alternately for filtering the cosine signal and for filtering the sine signal. The blocks used for filtering the cosine signal contain those detector groups G1, G3 which generate output signals having a phase of 0° and 180°, respectively. The detector blocks used for filtering the sine signal include detector groups G2, G4 which generate output signals having a phase of 90° and 270°, respectively.

In this context, it should be taken into account that in the detector blocks used for filtering the cosine signal and in the detector blocks used for filtering the sine signal, in each case detector groups G1 or G3, and G2 or G4, respectively, are subject alternately to a distance filter and a width filter. Thus, as illustrated in FIG. 2, in the first detector block, the width of detector groups G1 which generate output signals having a phase of 0° is in each case eight detector elements. On the other hand, the width of the two detector groups G3 which generate output signals having a phase of 180° is once eleven detector elements and once five detector elements. Thus, in this first detector block, those detector groups G1 which generate output signals having a phase of 0°, given a constant width, are subject to a distance filter, and those detector groups G3 which generate output signals having a phase of 180° are subject to a width filter. In the third detector block, which again includes detector groups G1, G3 that generate output signals having a phase of 0° and 180°, respectively, the situation is reversed. Those detector groups G3 which generate an output signal having a phase of 180° have a constant width of eight detector elements there, while the other detector groups G1 have a width of ten and six detector elements, respectively.

The same situation exists in the second and fourth detector blocks, which each contain detector groups G2, G4 that generate output signals having a phase of 90° and 270°, respectively. In the second detector block, detector groups G2 which generate output signals having a phase of 90° each have a constant width of eight detector elements, while the two other detector groups G4 in one case have a width of ten detector elements, and in the other case have a width of six detector elements. In the fourth detector block, the situation is again reversed. Here, detector groups G4 which generate output signals having a phase of 270° have a constant width of eight detector elements, and the other detector groups G2 in one case have a width of eleven detector elements, and in the other case have a width of five detector elements.

Both in the case of the detector blocks used for filtering the cosine signal, and for the detector blocks used for filtering the sine signal, the distance between the detector groups which are subject to a distance filter varies. In the detector blocks illustrated in FIG. 2, it amounts partially to eighteen and partially to nineteen detector elements. In a similar manner, there is a variation in the width filter, which in one part of the detector blocks is, formed by the combination of detector groups having the width of eleven detector elements with detector groups having the width of five detector elements, and in other detector blocks, is formed by the combination of detector groups having the width of ten detector elements with detector groups having the width of six detector elements. This is carried out for the reasons, indicated above, of minimizing the composite error of the arrangement, in order to optimize the filtering action.

The arrangement illustrated in FIG. 2 may provide an improved symmetry both with respect to the filtering of the cosine signal on one hand and the filtering of the sine signal on the other hand, and with respect to the use of the width filter on one hand and the distance filter on the other hand in the individual detector blocks. In particular, this may improve the insensitivity of the arrangement to soiling.

It may be that the formation and arrangement of detector groups G1, G2, G3 and G4 illustrated in FIG. 2 permit a homogeneous filtering both of the sine signal and of the cosine signal. However, this arrangement may have the disadvantage of the loss of the one-field character of the scanning, i.e., obtaining all four phases from one signal period.

To compensate for this disadvantage, as illustrated in FIG. 3, a doubling of the scanning track is provided, so that detection device D includes two tracks S1, S2 arranged side by side and perpendicular to its extension direction R (measuring direction), detector blocks having detector groups G1, G3 for filtering the cosine signal and detector blocks having detector groups G2, G4 for filtering the sine signal being arranged in alternation in each of the two tracks. In this case, detector blocks arranged side by side transversely to extension direction R are used for filtering different signals. That is, in addition to a filter block (made up of detector groups G1, G3 having output signals of the phase 0° and 180°) arranged in track S1 for filtering the cosine signal, in each case a detector block for filtering the sine signal (thus made up of detector groups G2 and G4 that generate output signals of the phase 90° and 270°) is arranged in the other track S2, and vice versa.

Thus, in this case, a base unit, which is used for filtering both the cosine signal and the sine signal and to this end includes both width filters and distance filters, has an extension of merely 32 detector elements (corresponding to two grating constants d of the measuring graduation to be scanned) along extension direction R. Therefore, another aspect of the arrangement illustrated in FIG. 3, having two tracks S1, S2 arranged side by side, parallel to one another along extension direction R, is in the reduction of the scanning length.

As illustrated in FIGS. 2 and 3, gaps L between adjacent detector elements E correspond to detector elements of the detector device that are not used when forming detector groups G1, G2, G3 and G4. The corresponding, unused detector elements are not connected to the evaluation unit, thus in particular are not interconnected with the further detector elements for forming detector groups. However, they may also be gaps L that, for technical reasons, contain no detector elements in any case.

According to the procedure described above, e.g., for the filtering of the third harmonic, by suitably combining individual detector elements E of a detection device D and by suitably arranging detector groups G1, G2, G3, G4 thereby formed one after the other, it is also possible to eliminate other harmonics as well as a plurality of harmonics from the output signals of the detection device at the same time, and, e.g., on the basis of the filter functions described above based on a distance filter and a width filter.

For a compact example embodiment of the arrangement used for the filtering, the original, finest structure having the smallest raster $g_f$ may already be implemented in a plurality of tracks, in order to achieve an additional degree of freedom for the optimal distribution of the detector elements for the filtering of the coarser track having a larger raster (cf. German Published Patent Application No. 100 20 575).

Figure 4:
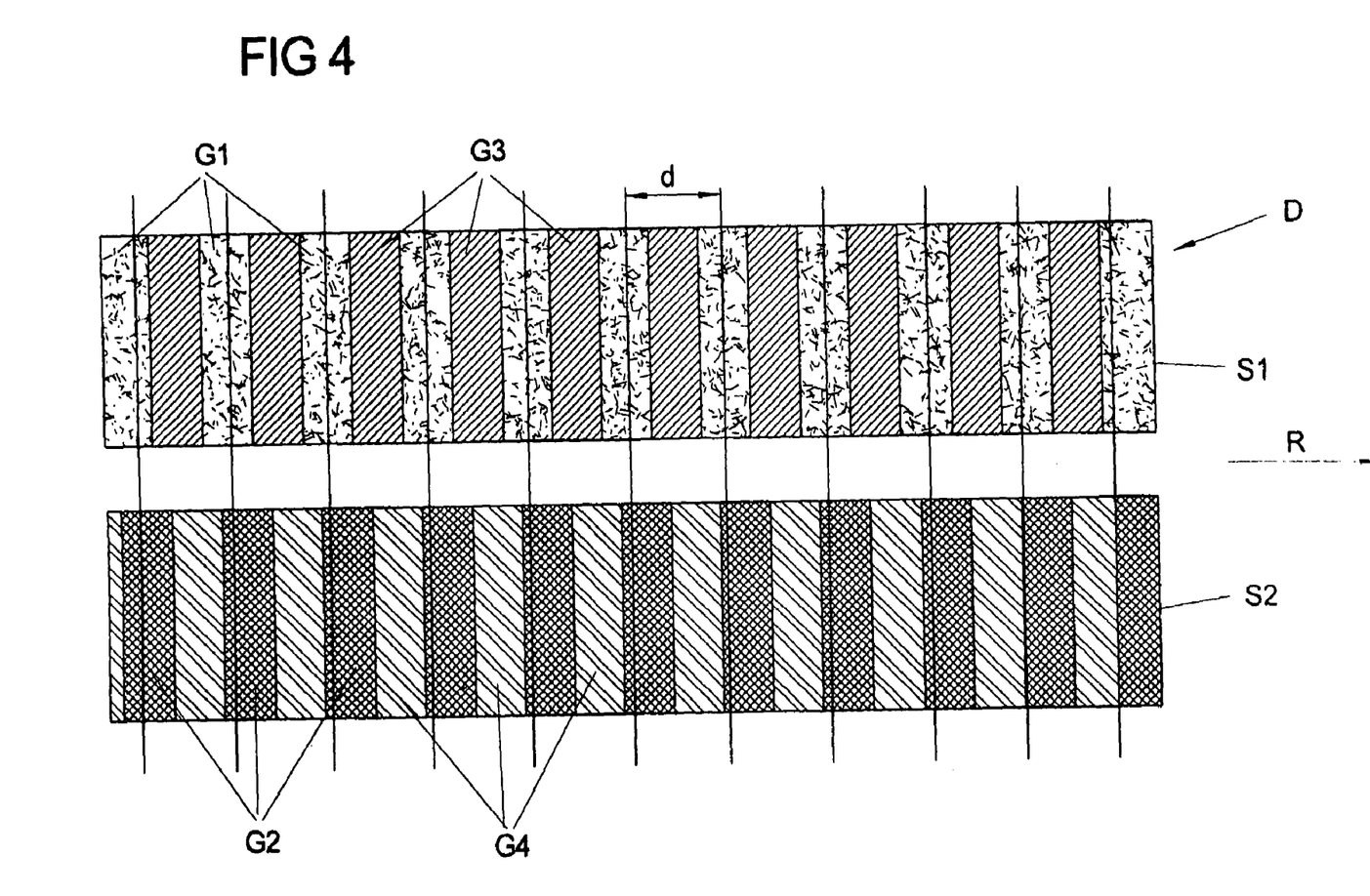
FIG. 4 illustrates a modification of the arrangement illustrated in FIG. 3, the distribution of the detector groups in the two tracks being determined by complementary arcsine functions.

FIG. 4 illustrates a detection device D having two tracks S1, S2 arranged side by side transversely to extension direction R (measuring direction). Each of the two tracks S1, S2 extends along measuring direction R. First track S1 is formed by detector groups G1, G3 which generate output signals having a phase of 0° and 180°, respectively, and second track S2 is formed by detector groups G2, G4 which generate output signals having a phase of 90° and 270°, respectively.

This is a second example for the use of complementary filter structures for surface filtering. While in the exemplary embodiments described with reference to FIGS. 1 to 3, a distance filter and a width filter are used as complementary filters, in the exemplary embodiment illustrated in FIG. 4, two complementary arcsine filters are used as the generator or generating function for the location of the detector groups. The ideal position for the location of detector groups G1, G3 having output signals with a phase of 0° and 180°, respectively, is described by the generator.

$$X_{O k} = \frac{k * d}{2 * \pi} \arcsin\left(\frac{k}{N}\right),$$

where $k = -N \ldots N$ and $N = 3, 5, 7 \ldots$.

The (supplementary) generator or generating function, complementary thereto, of a filter function reads:

$$X_{180k} = \frac{(k + 0.5) * d}{2 * \pi} \arcsin\left(\frac{k}{N}\right)$$

FIG. 4 illustrates an ideal arrangement of detector groups G1, G2, G3, G4. According to the exemplary embodiments described above with reference to FIGS. 1 to 3, the problem may also exist here that the detector groups formed from real detector elements do not have precisely the location and extension indicated by the generating filter functions. Accordingly, here as well, the composite error may be minimized or eliminated to the greatest extent possible by the suitable arrangement of detector groups, each of which has deviations from the ideal detector group. This is accomplished on the basis of the same principle explained above for errors $f_1$ and $f_2$ when filtering the harmonics by a distance filter and a width filter.

According to an example embodiment of the present invention, the individual detector groups are characterized by a characteristic variation of their extension transversely to extension direction R.

Starting from a detection device in which a plurality of photo elements is arranged side by side transversely to extension direction R (measuring direction), a filter function of the detection device designed for the scanning of the coarser measuring graduation may also be achieved by suitable interconnection of the individual detector elements along a direction Q transversely to the extension or measuring direction of detection device D. That is to say, specific to underlying measuring graduation M (cf. FIG. 7), detector elements are interconnected in the mark direction of graduation marks T of measuring graduation M. As already mentioned, this may only be possible if a sufficient number of detector elements are arranged side by side along transverse direction Q (perpendicular to extension direction R).

Alternatively, the corresponding tracks may have detector elements from the start whose extension varies along transverse direction Q. In that case, only detector elements arranged side by side along extension direction R and having a different extension in transverse direction Q have to be interconnected in order to form the desired detector groups.

Regardless of whether the individual detector regions that are arranged side by side in extension direction R and in each case have a different extension along transverse direction Q, are formed by detector elements which have a different extension along transverse direction Q from the start, or by the interconnection of smaller detector elements along transverse direction Q, these detector regions may in each case still be interconnected in extension direction R for forming detector groups.

Figure 5A:
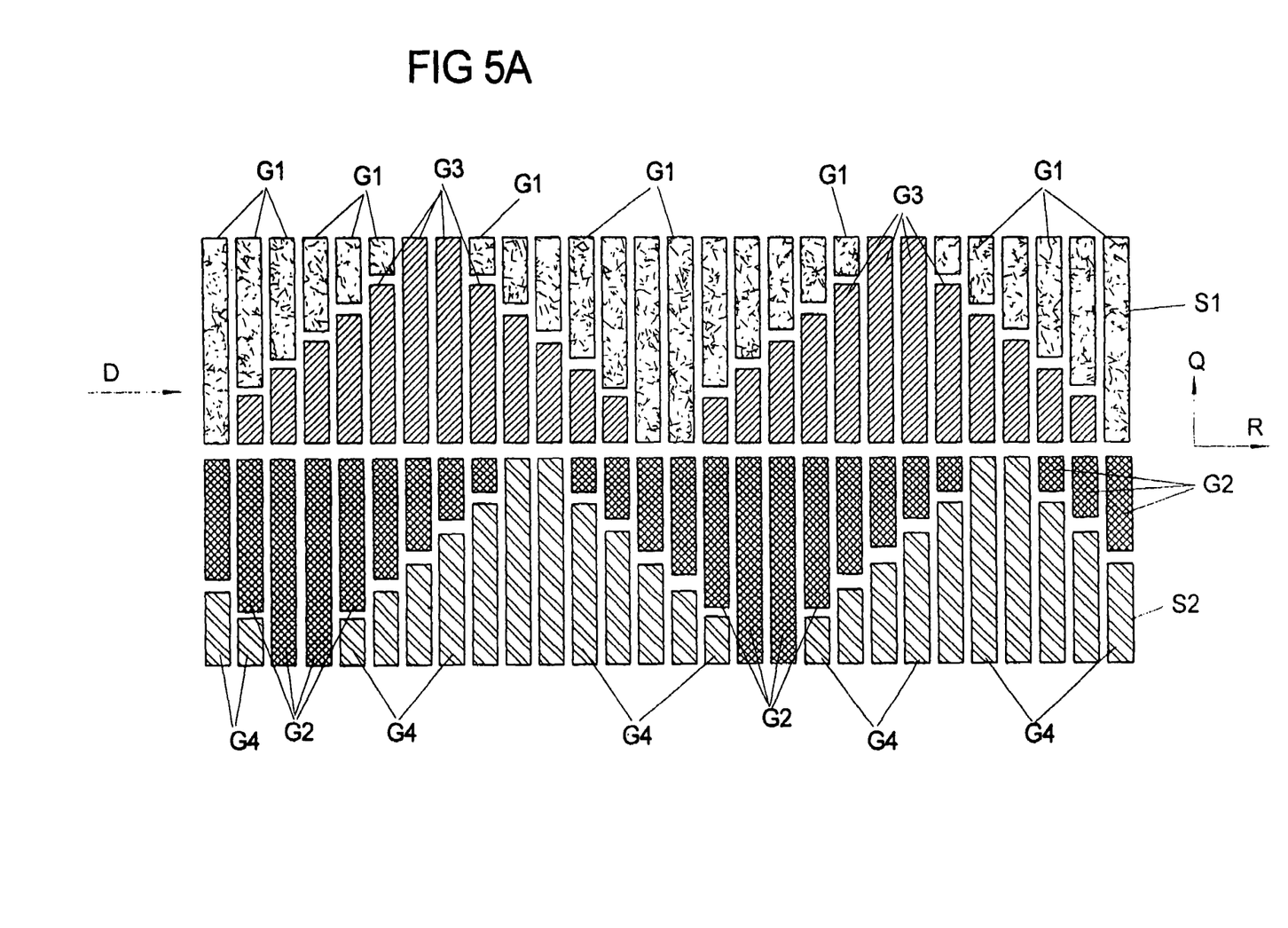
FIG. 5a illustrates a modification of the arrangement illustrated in FIGS. 3 and 4, the extension of the detector groups transversely to the extension direction of the tracks varying.

FIG. 5a illustrates such an arrangement having two side-by-side tracks S1, S2, the one track S1 having detector groups G1, G3 which generate output signals having a phase: of 0° and 180°, respectively, and the other adjacent track S2 containing detector groups G2, G4 which generate output signals having a phase of 90° and 270°, respectively.

The filter functions of the arrangement illustrated in FIG. 5a, which determine the interconnection of the detector elements transversely to extension direction R, read:

$$y_{ok} = h^* |\cos(\Pi^* k/N)|;$$

and $$y_{180k} = h^* (1 - |\cos(\Pi^* k/N)|)$$

In the foregoing, h represents the height of the respective track S1, S2 (extension transversely to extension direction R), N represents the number of detectors per graduation period d of the measuring graduation to be scanned, and k=−N . . . N (that is, k assumes an integral value between −N and N). Thus, involved here are complementary filter functions, each on the basis of a cosine function.

Figure 5B:
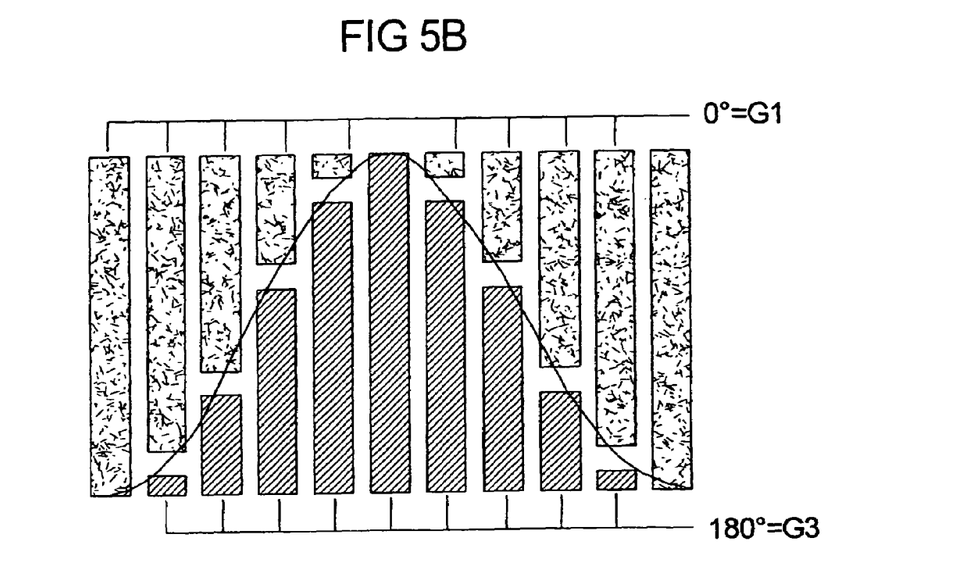

FIG. 5b schematically illustrates how an ideal filter function, represented by a solid line, on the basis of a sine or cosine function, may be reconstructed approximately by the interconnection of detector elements transversely to the extension direction of the detection device, and specifically for detector groups G1, G3 of the phase 0° or 180° for example.

In FIGS. 5a and 5b, the individual detector regions, whose extension varies along a transverse direction Q perpendicular to extension direction R, may be achieved on one hand by the suitable interconnection of detector elements arranged side by side along transverse direction Q, or on the other hand in that the individual detector elements, which are ultimately interconnected along extension direction R to form detector groups G1, G2, G3, G4, have a different extension along transverse direction Q from the start.

Figure 6:
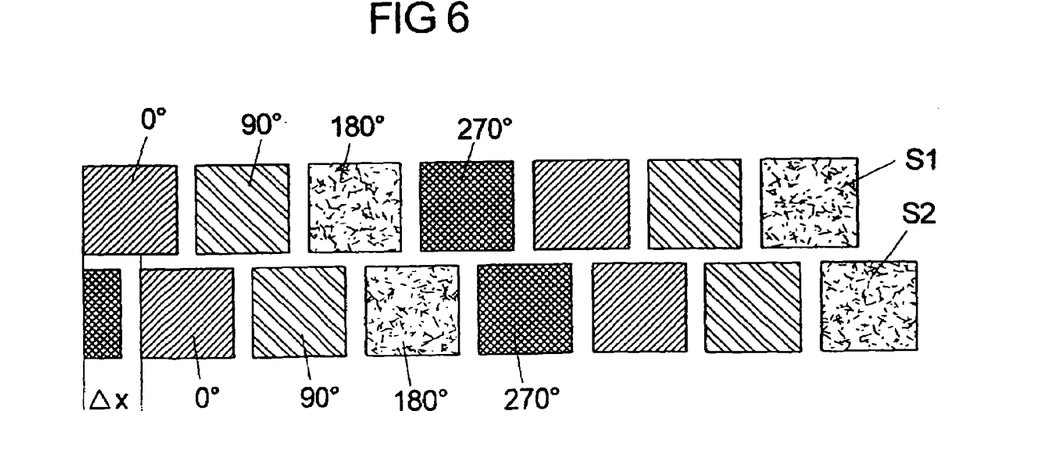
FIG. 6 is a schematic representation of the displacement of detector groups of one and the same phase which are arranged in adjacent tracks.

FIG. 6 illustrates for two adjacent tracks, each of which has detector groups of all four relevant phases (0°, 90°, 180°, 270°), the displacement distance Δx of the detector groups of one phase (0°, 90°, 180°, 270°), arranged, however, in different tracks S1 and S2, respectively, which is given by $$\Delta x = m^* d^* (1 \pm 1/(2^* n));$$

where $d = i^* g_f$. In the foregoing, n represents the harmonic to be filtered, m represents a whole number, and $g_f$ represents the grating constant of the periodic arrangement of the detector elements. Moreover, d represents the grating constant of the measuring graduation to be scanned and i represents a natural number.

It may also be taken into account in this variant that Δx is generally not an integral multiple of $g_f$, so that actual displacement distance Δx of detector groups, which may really only be formed by an integral multiple of $g_f$, deviates from the ideal value for Δx here, as well. The composite error may again be minimized here, as explained above using the width filter and the distance filter as an example.

What is claimed is:

1. A position-measuring device, comprising:
a measuring graduation extending along a measuring direction; and
a scanning unit configured to scan the measuring graduation, the scanning unit including a detection device, the detection device including a plurality of detector elements arranged periodically one after another along an extension direction, the detector elements configured to generate, during scanning of the measuring graduation, output signals suppliable to an evaluation unit, a plurality of adjacent detector elements interconnected to form a detector group and arranged to join output signals and to supply output signals as a unified signal to the evaluation unit, the detector groups arranged one after another along the extension direction to eliminate at least one defined harmonic from the output signals,
wherein each individual detector element is configured with a geometry to filter at least one further harmonic that results from scanning of a measuring graduation having a different graduation period.

2. The position-measuring device according to claim 1, wherein a plurality of detector groups, set apart from each other in the extension direction, are interconnected to join output signals and to supply output signals as a unified signal to the evaluation unit.

3. The position-measuring device according to claim 2, wherein the interconnected detector groups are configured to generate output signals of one phase.

4. The position-measuring device according to claim 3, wherein a number of detector elements of the detector groups of one phase varies along the extension direction.

5. The position-measuring device according to claim 1, wherein the detector groups are arranged along at least two tracks located side by side perpendicular to the extension direction.

6. The position-measuring device according to claim 5, wherein the detector groups of individual phases are arranged in different tracks along the extension direction displaced relative to each other by a specific displacement distance.

7. The position-measuring device according to claim 6, wherein the displacement distance of the detector groups of one phase satisfies the conditions:

$$\Delta x = m^* d^* (1 \pm 1/(2^* n));  \text{ and}$$

$$d = i^* g_f;$$

wherein Δx represents the displacement distance, d represents a grating constant of the measuring graduation to be scanned, $g_f$ represents a grating constant of a periodic arrangement of individual detector elements, n represents a harmonic to be filtered, m represents a whole number, and i represents a natural number.

8. The position-measuring device according to claim 7, wherein an arrangement of the detector groups along the extension direction is in accordance with a linkage of a first generating filter function, according to which a spacing of the detector groups in the extension direction varies, with a second generating filter function, according to which an extension of the detector groups in the extension direction varies.

9. The position-measuring device according to claim 7, wherein an arrangement of the detector groups in the extension direction is in accordance with a linkage of two arcsine functions.

10. The position-measuring device according to claim 1, wherein an arrangement of the detector groups along the extension direction is in accordance with at least one generating filter function that, for each detector element, indicates with which adjacent detector elements the detector element is interconnected.

11. The position-measuring device according to claim 10, wherein the arrangement of the detector groups along the extension direction is in accordance with a linkage of at least two generating filter functions that relate at least one of (a) to different detector groups and (b) to different features of a detector group.

12. The position-measuring device according to claim 11, wherein the arrangement of the detector groups along the extension direction is in accordance with a linkage of at least two complementary filter functions that relate at least one of (a) to different detector groups and (b) to different features of a detector group.

13. The position-measuring device according to claim 1, wherein a distance between detector groups varies along the extension direction to eliminate harmonics.

14. The position-measuring device according to claim 13, wherein the distance between detector groups satisfies the conditions:

$$\Delta x = m*d*(1 \pm 1/(2*n)); \text{ and}$$

$$d = i*g_f;$$

wherein $\Delta x$ represents the displacement distance, d represents a grating constant of the measuring graduation to be scanned, $g_f$ represents a grating constant of a periodic arrangement of individual detector elements, n represents a harmonic to be filtered, m represents a whole number, and i represents a natural number.

15. The position-measuring device according to claim 1, wherein an extension of the detector groups varies along the extension direction to eliminate harmonics.

16. The position-measuring device according to claim 15, wherein the extension of the detector groups in the extension direction satisfies the conditions:

$$\Delta b = k*d/n; \text{ and}$$

$$d = i*g_f;$$

wherein $\Delta b$ represents the extension of the detector groups in the extension direction, i and k represent natural numbers, d represents a grating constant of the measuring graduation to scanned, $g_f$ represents a grating constant of a periodic arrangement of individual detector elements, and n represents a harmonic to be filtered.

17. The position-measuring device according to claim 1, wherein the detector groups are arranged along the extension direction in accordance with an arcsine function.

18. The position-measuring device according to claim 17, wherein a position of the detector groups satisfies the conditions:

$$x = k*d/(2*\Pi)*\arcsin(k/N); \text{ and}$$

$$d = i*G_f;$$

wherein x represents the position of the detector groups, i and N represent natural numbers, k represents a whole number with an absolute value less than or equal to N, d represents a grating constant of the measuring graduation to be scanned, and gf represents a grating constant of a periodic arrangement of individual detector elements.

19. The position-measuring device according to claim 1, wherein an extension of the detector groups perpendicular to the extension direction varies.

20. The position-measuring device according to claim 19, wherein the extension of the detector groups perpendicular to the extension direction varies in accordance with one of (a) a cosine function and (b) a sine function.

21. A scanning unit for scanning a measuring graduation that extends along a measuring direction, comprising:

a detection device including a plurality of detector elements arranged periodically one after another along an extension direction, the detector elements configured to generate, during scanning of the measuring graduation, output signals suppliable to an evaluation unit, a plurality of adjacent detector elements interconnected to form a detector group and arranged to join output signals and to supply output signals as a unified signal to the evaluation unit, the detector groups arranged one after another along the extension direction to eliminate at least one defined harmonic from the output signals, wherein each individual detector element is configured to filter at least one further harmonic that results from scanning of a measuring graduation having a different graduation period.

22. The scanning unit according to claim 21, wherein an arrangement of the detector groups along the extension direction is in accordance with at least one generating filter function that, for each detector element, indicates with which adjacent detector elements the detector element is interconnected.

23. The scanning unit according to claim 21, wherein a distance between detector groups varies along the extension direction to eliminate harmonics.

24. The scanning unit according to claim 21, wherein an extension of the detector groups varies along the extension direction to eliminate harmonics.

25. The scanning unit according to claim 21, wherein an extension of the detector groups perpendicular to the extension direction varies.

* * * * *